UNITED STATES PATENT OFFICE.

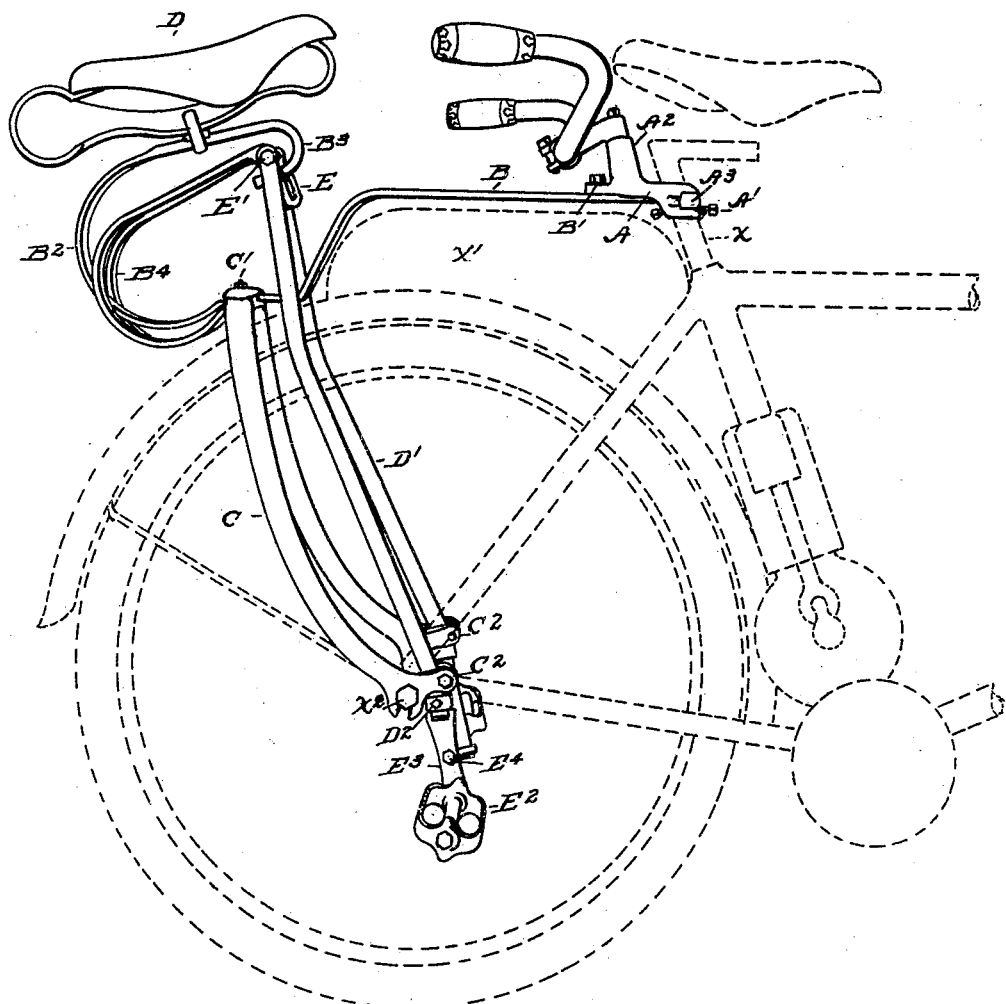

LOUIS DE ROME, OF ALAMEDA COUNTY, CALIFORNIA.

BICYCLE ATTACHMENT.

No. 823,161.　　　　Specification of Letters Patent.　　　Patented June 12, 1906.

Application filed November 16, 1905. Serial No. 287,616.

*To all whom it may concern:*

Be it known that I, LOUIS DE ROME, a citizen of the United States, residing in the county of Alameda and State of California, have invented certain new and useful Improvements in Bicycle Attachments; and I do hereby declare the following to be a full, clear, and exact description of the said invention, such as will enable others skilled in the art to which it most nearly appertains to make, use, and practice the same.

This invention relates to improvements in bicycles, and particularly to attachments thereto; and it consists of a tandem-seat attachable to the bicycle-frame behind the bicycle-seat.

Attention is directed to my patent, No. 571,302, November 10, 1896, in the same class.

The object of the present invention is to provide a tandem-seat attachable to the diamond-frame bicycle in the rear of the main seat without materially altering the frame or adjustment of the bicycle.

Broadly, the invention consists of a trace or rod of metal attachable to the seat-post and extending rearward over the rear wheel to a downwardly-extended fork straddling the rear wheel and attached to the bicycle-frame at the axis of the rear wheel. From the crown of said fork a curved spring rises to the desired height for the reception of the saddle. From the same crown of the fork two secondary springs curve upward on either side of the saddle-spring to a point beneath the saddle, where they are pivoted to the pedal-rods, extending downwardly through guides on the fork, and support pedals on either side of the rear wheel. The handle-bar for the tandem-seat rises from the same block that attaches the tandem-frame to the seat-post of the bicycle.

In the drawing the invention is shown in side elevation, slightly in perspective, attached to the rear of a motor-bicycle frame.

In detail I have shown my bicycle attachment as consisting of the attaching clamp-block A, having an opening to admit the seat-post X, to which it is fixed by the set-screw A'. The upward extension $A^2$ receives the handle-bar post, which is adjustable vertically therein. The under side of said block is provided with a socket into which the end of the brace B extends and is secured by the set-screw B'.

The brace B, which is preferably of spring metal, is bent to avoid the gasolene-tank X', bundle-carrier, or any object attached to the rear of the bicycle-frame. When no obstruction exists, this brace extends in a direct or graceful line to the crown-clamp C' of the fork C. A continuation of the brace B extends through the clamp and is curved upward in a graceful spring $B^2$, upon which the saddle D is adjustably mounted. The end $B^3$ of the spring is then bent backward and extends through a loop or stirrup E between the pedal-rods. From the crown the fork C extends down on both sides of the rear wheel to the axis, to which it is secured between the bicycle-frame and the nuts $X^2$. The brace B and the fork C form an angular and rigid attachment to the bicycle-frame. From the pivot-pin E' the pedal-rods D' extend downward through the guides $C^2$, in which they move freely. The pedals $E^2$ are mounted upon the sleeves $E^3$, which slide over the ends of the pedal-rods, to which they are adjustably secured by the set-screws $E^4$.

The auxiliary springs $B^4$ consist of two separate curved springs, the lower ends being secured in the clamp C' and the upper ends terminating on the pivot-pin E'.

The weight of the rider astride the saddle D is carried normally by the spring $B^2$, the weight upon the saddle being partially relieved by the weight carried by the feet resting upon the pedals $E^2$.

In the event of a sudden jolt, by reason of the cycle passing over a rut or obstruction, the saddle is depressed until the end $B^3$ of the spring engages the lower loop of the stirrup E, bringing the auxiliary springs $B^4$ into play, whereby said springs $B^4$ will assist in supporting the weight of the rider. To limit the uprise of the springs, the pedal-rods are provided with the adjustable stops $D^2$, which regulate the tension of the springs. By this construction the rider is enabled on very rough roads to ride on the pedals entirely, getting the full advantage of the springs and avoiding all spinal vibrations transmitted to the saddle.

Obviously tubular construction may be utilized for all rigid parts, and the auxiliary springs may be omitted and the construction variously modified without departing from the spirit of the invention.

Having thus described this invention, what is claimed, and desired to secure by Letters Patent, is—

1. A bicycle attachment consisting of a clamp-block attachable to the saddle-post; handle-bars adjustably secured to said clamp-block; a brace-rod extending rearward and secured to the crown of a fork straddling the rear wheel and secured at, or near the axis thereof; a saddle-spring curved upward from the crown of said fork, and supporting a saddle, the free end of said spring engaging a stirrup supporting pedal-rods extending through guides on said fork; pedals adjustably secured to said pedal-rods; stops adjustably fixed on said pedal-rods under said guides; and auxiliary springs clamped to the crown of said fork, and curved upwardly and secured to said pedal-rods at the said stirrup.

2. A bicycle attachment consisting of a clamp-block attachable to the saddle-post and having handle-bars secured thereto; a brace-rod extending from said clamp-block to a fork straddling the rear wheel and secured to the bicycle-frame; a saddle-spring supported by said fork; pedal-rods suspended from said saddle-spring, and extending through guides on said fork, and pedals adjustably secured thereto.

3. A bicycle attachment consisting of a clamp block attachable to the bicycle-frame; a brace-rod extending from said clamp block to a fork straddling the rear wheel and attachable to the bicycle-frame; a saddle supported from said fork; and pedal-rods suspended from said seat; and pedals mounted upon said pedal-rods.

4. A bicycle attachment consisting of a tandem-saddle attachable in the rear of the bicycle-seat; and having pedal-rods resiliently suspended therefrom.

5. A bicycle attachment consisting of a tandem-saddle attached in the rear of the bicycle-seat and having pedal-rods suspended therefrom, and guiding means for said rods.

6. A bicycle attachment consisting of a tandem-saddle attached in rear of the bicycle-seat and having pedal-rods resiliently suspended therefrom, and guiding means for said rods.

In testimony whereof I have hereunto set my hand this October, 1905.

LOUIS DE ROME.

Witnesses:
    BALDWIN VALE,
    A. M. HENDRY.